(12) United States Patent
Atkinson

(10) Patent No.: US 7,057,806 B2
(45) Date of Patent: Jun. 6, 2006

(54) SCANNING LASER MICROSCOPE WITH WAVEFRONT SENSOR

(75) Inventor: Matthew R. C. Atkinson, Cottage Grove, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/435,180

(22) Filed: May 9, 2003

(65) Prior Publication Data

US 2004/0223214 A1    Nov. 11, 2004

(51) Int. Cl.
*G02B 21/00* (2006.01)
(52) U.S. Cl. .................................. 359/368; 250/201.9
(58) Field of Classification Search ................ 359/368, 359/385, 389; 250/559.6, 201.9
See application file for complete search history.

(56) References Cited

U.S. PATENT DOCUMENTS

| | | | |
|---|---|---|---|
| 5,113,064 A | 5/1992 | Manhart | |
| 5,229,889 A | 7/1993 | Kittell | |
| 5,777,719 A | 7/1998 | Williams et al. | |
| 5,936,720 A | 8/1999 | Neal et al. | |
| 5,949,521 A | 9/1999 | Williams et al. | |
| 5,978,053 A | 11/1999 | Giles et al. | |
| 6,095,651 A | 8/2000 | Williams et al. | |
| 6,184,974 B1 | 2/2001 | Neal et al. | |
| 6,199,986 B1 | 3/2001 | Williams et al. | |
| 6,264,328 B1 | 7/2001 | Williams et al. | |
| 6,299,311 B1 | 10/2001 | Williams et al. | |
| 6,376,819 B1 | 4/2002 | Neal et al. | |
| 6,379,005 B1 | 4/2002 | Williams et al. | |
| 6,382,795 B1 | 5/2002 | Lai | |
| 6,406,146 B1 | 6/2002 | Lai | |
| 6,477,273 B1 | 11/2002 | Atkinson | |
| 6,570,143 B1* | 5/2003 | Neil et al. | ................ 250/201.9 |
| 6,680,796 B1* | 1/2004 | Engelhardt | ................... 359/388 |
| 6,771,417 B1* | 8/2004 | Wolleschensky et al. | ... 359/368 |
| 2002/0024007 A1 | 2/2002 | Engelhardt et al. | |

(Continued)

FOREIGN PATENT DOCUMENTS

DE    4023650 A    1/1992

(Continued)

OTHER PUBLICATIONS

W. H. Southwell; *Wave-Front Estimation From Wave-Front Slope Meausrements;* Journal Optical Society of America, vol. 70, No. 8, Aug. 1980, pp. 998-1006.

(Continued)

*Primary Examiner*—Mark A. Robinson
*Assistant Examiner*—Alessandro Amari
(74) *Attorney, Agent, or Firm*—Philip y. Dahl

(57) ABSTRACT

An enhanced resolution scanned image of an object is produced by a scanning laser microscope which includes an illumination arm for scanning an object with a focused probe beam and a detection arm for receiving light from the object. The detection arm includes a detector which collects and detects light from the object to produce pixel data for a plurality of pixels. In addition, the detection arm includes a wavefront sensor for sensing phase variations of the light from the object to produce wavefront data for scanned pixel locations. From the wavefront shape of the collected light at each pixel location, a high frequency spectrum is determined which corresponds to uncollected scattered light from small scale features of that pixel location. An enhanced resolution image of a region of interest is produced based on the high frequency spectra of the scanned pixel locations.

27 Claims, 9 Drawing Sheets

U.S. PATENT DOCUMENTS

| | | |
|---|---|---|
| 2002/0044332 A1 | 4/2002 | Engelhardt et al. |
| 2002/0109913 A1 | 8/2002 | Gugel et al. |
| 2003/0025942 A1 | 2/2003 | Atkinson |

FOREIGN PATENT DOCUMENTS

| | | |
|---|---|---|
| DE | 19624421 A | 1/1997 |
| EP | 1123491 B1 | 5/2002 |
| WO | WO 91/07682 A | 5/1991 |
| WO | WO 98/27863 | 7/1998 |
| WO | WO 99/06856 | 2/1999 |
| WO | WO 99/57650 | 11/1999 |
| WO | WO 00/17612 | 3/2000 |
| WO | WO 2001/29756 | 4/2001 |
| WO | WO 01/82228 A2 | 11/2001 |
| WO | WO 02/30273 A1 | 4/2002 |

OTHER PUBLICATIONS

J. L. Harris; *Diffraction And Resolving Power;* Journal Optical Society of America, vol. 54, No. 7, Jul. 1964, pp. 931-936.

J. L. Beverage, R. V. Shack, and M. R. Descour; *Measurement Of Three-Dimensional Microscope Point Spread Function Using A Shack-Hartmann Wavefront Sensor,* Journal of Microscopy, vol. 205, Jan. 2002, pp. 61-75.

\* cited by examiner

SCANNING LASER MICROSCOPE WITH WAVEFRONT SENSOR

FIELD OF THE INVENTION

The present invention relates to scanning laser microscopes. In particular, the present invention concerns an improved scanning laser microscope equipped with a wavefront sensor to collect wavefront data from scanned pixel locations. The wavefront data collected from the wavefront sensor can be used to produce an enhanced resolution image.

BACKGROUND

Known scanning laser microscopes include an illumination arm and a detection arm. The illumination arm generates a focused probe beam which is scanned across a sample or object. The reflected, scattered, or emitted light is collected and detected synchronously with the scanning to build up an image on a pixel-by-pixel basis. The detection arm of the microscope may include spectral filters (for fluorescence or photoluminance imaging), a spatial filter (for confocal imaging) and/or a polarization analyzer (for polarization imaging).

The detection arm of the scanning laser microscope includes an objective lens that collects the diffracted light from the illuminated spot. The objective lens collects light diffracted from low spatial frequency features, in other words from relatively large and slowly changing features of the object within the area of the incident focused spot. Light is also diffracted from high spatial frequency features, which are defined as rapidly changing features of the object within the area of the focused spot. The light from the high spatial frequency features is scattered over high angles, which are outside of the diameter of the objective lens, and therefore not collected.

In a conventional scanning laser microscope the total beam incident on the detector for each pixel is detected. This amounts to spatial integration of the detected beam. The content of that detected beam is limited by the ability of the objective lens to collect light diffracted from the object. The classical diffraction limit, which determines the resolution of the microscope, is based on integrating the collected light.

In some known scanning laser microscopes, a Hartmann-Shack wavefront sensor (HSWS), has been added to measure the wavefront shape of the beam in order to correct for optical aberrations. The Hartmann-Shack wavefront sensor includes a micro lens array and a sensor array such as a CCD camera. Each lens of the micro lens array samples the incident field and focuses a spot on a portion of the sensor array. The intensity of each spot detected by the sensor array indicates the intensity of the sampled field, and the displacement of each spot indicates the gradient of the phase of the field in that sub-region (i.e. the local wavefront slope). The wavefront shape information from the Hartmann-Shack wavefront sensor is used to drive deformable mirrors in the illumination arm of the microscope in order to reduce any imaging aberrations that are present. Wavefront sensors and deformable mirrors can be used to advantage in situations where the sample is imaged through a distorting medium. An example is where the object to be imaged is beneath a thick glass plate which introduces spherical aberrations. Other applications have included astronomy and ophthalmology.

BRIEF SUMMARY OF THE INVENTION

Briefly, the present invention provides a scanning laser microscope comprising 1) an illumination arm for scanning an object with a focused probe beam; 2) a detection arm for receiving light from the object, the detection arm including a) a detector for collecting and detecting light from the object to produce pixel data for each of a plurality of pixels and b) a wavefront sensor for sensing phase variations of the light from the object to produce wavefront data for each of said plurality of pixels; and 3) a data processor for producing image data for the plurality of pixels based upon pixel data for each pixel and wavefront data for each pixel.

In another aspect, the present invention provides a scanning microscope comprising 1) an illumination arm for scanning a focused light spot over pixel locations of an object; 2) an objective lens for collecting light from illuminated pixel locations; 3) a wavefront sensor for sensing waveform shape of the collected light at each pixel location; 4) a data processor for deriving, from the sensed waveform shape at each pixel location, image information for that pixel location; and 5) a display for displaying an image of the object based upon the image information derived for the pixel locations.

In another aspect, the present invention provides a method of high resolution imaging of an object, the method comprising: 1) scanning the object to produce pixel data representing light intensity at a plurality of pixel locations; 2) displaying an image of the object based upon the pixel data; 3) selecting a region of interest of the image; 4) scanning the region of interest; 5) producing, for each pixel location of the region of interest, wavefront shape data at that pixel location; 6) generating image data for each pixel location of the region of interest based upon the wavefront shape data from the pixel locations in the region of interest; and 7) displaying an image of the region of interest based upon the image data.

In another aspect, the present invention provides a method of producing an enhanced resolution scanned image of an object, the method comprising: 1) identifying a region of interest of the object having small scale features; 2) scanning pixel locations in the region of interest with a focused light beam; 3) collecting light from the scanned pixel locations; 4) sensing wavefront shape of the collected light from the scanned pixel locations; 5) determining from the wavefront shape of the collected light from each pixel location a high frequency spectrum corresponding to uncollected scattered light from small scale features of that scanned pixel location; and 5) providing an enhanced resolution image of the region of interest based on the high frequency spectra of the scanned pixel locations.

In another aspect, the present invention provides a method of producing an image of an object, the method comprising: 1) illuminating an object with an incident focused spot; 2) collecting light diffracted from low spatial frequency features of the object; 3) measuring intensity of the collected light; 4) deriving high spatial frequency features of the object based upon wavefront information of the collected light; and 5) displaying an enhanced resolution image of the object based upon the derived high spatial frequency features.

DETAILED DESCRIPTION

The present invention is an improved scanning laser microscope which includes a wavefront sensor for sensing phase variations of light from a region of interest in the object. The phase variations indicate a wavefront shape for the collected light at each scanned pixel location in the region of interest. From the wavefront shapes, a high frequency spectrum corresponding to uncollected scattered light can be derived. This scattered light is produced by small scale features of the scanned pixel location. An enhanced resolution image of the region of interest is then produced based upon the high frequency spectra of the scanned pixel locations.

The present invention is based upon the recognition that there is more information in the collected light in the detection arm of a scanning laser microscope than is typically used. By using a wavefront sensor in parallel with conventional detection, the portion of the spatial frequency spectrum above system cutoff can be determined from a measurable spectrum represented by the light collected by the wavefront sensor. An enhanced image of a region of interest can be generated using the derived higher spatial frequency information.

Figure 1:
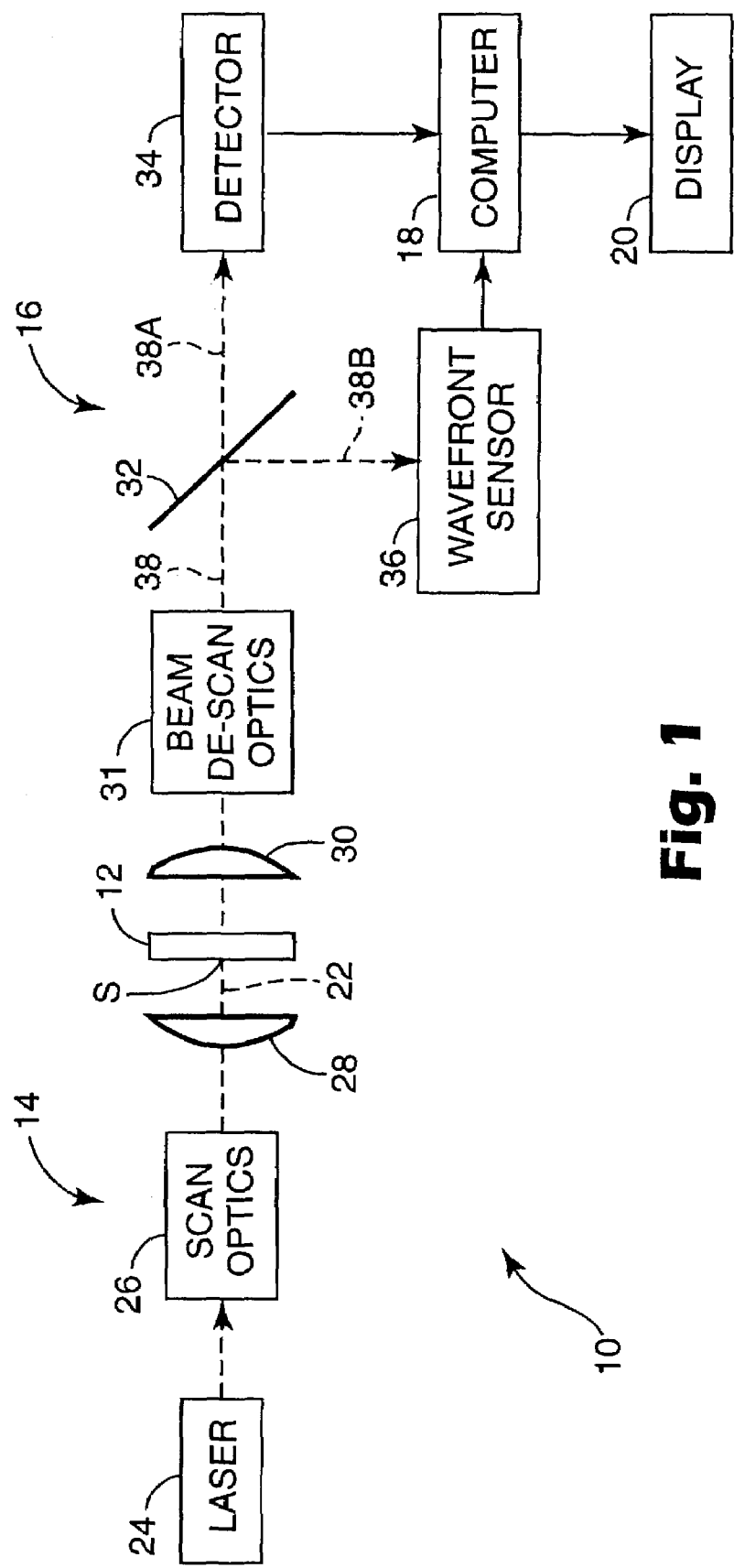
FIG. 1 is a block diagram of a scanning laser microscope of the present invention.

FIG. 1 is a block diagram of scanning laser microscope 10, which provides enhanced resolution images of selected areas of scanned object 12 (or sample). Scanning laser microscope 10 includes illumination arm 14, detection arm 16, computer 18, and image display 20.

Illumination arm 14 provides focused probe beam 22 which is scanned across object 12. Illumination arm 12 includes laser 24, light beam scanning optics 26 for scanning beam 20 in two dimensions, and focus lens 28 for focusing beam 22 to a focused spot S on object 12.

Detection arm 16 includes objective lens 30, beam de-scan optics 31, beam splitter 32, detector 34, and wavefront sensor 36. Objective lens 30 collects reflected, scattered, and emitted light from object 12 as beam 38. Beam de-scan optics 31 brings the beam back on axis. Beam splitter 32 splits collected light beam 38 into first beam 38A and second beam 38B. Detector 34 receives first beam 38A, while wavefront sensor 36 receives second beam 38B.

In operation, focused beam 22 is scanned across object 12, light 38 is collected, and the intensity of first beam 38A is detected synchronously by detector 34. As a result, pixel data representing the integrated intensity of first beam 38A received from each pixel location scanned by beam 22 is provided by detector 34 to computer 18. The pixel data is processed by computer 18 to produce image data which is displayed on display 20.

The user can then select a region of interest within the image for a higher resolution view. This selection is made, for example, by drawing a box around the region of interest on the display.

Computer 18 then causes illumination arm 14 to scan beam 22 within the region of interest. At each scanned pixel location within a region of interest, a wavefront measurement of second beam 38B is made by wavefront sensor 36 and provided to computer 18. Wavefront sensor 36 is preferably a Hartmann-Shack wavefront sensor (HSWS). This sensor includes of a micro lens (or lenslet) array that samples second beam 38B and focuses each subarea to a spot. This produces an array of spots which are detected by a CCD camera or detector array. The intensities and local shifts of the spots are then measured based on detector signals from the detector array. The intensity of each spot can be used to calculate the magnitude of the incident field, while the local shift of the spots is a measure of the wavefront gradient at wavefront sensor 36. The intensities and local shifts of the spots can be measured by a number of techniques using computer 18, including the centroid integration technique described in U.S. Pat. No. 6,477,273, the autothreshold technique described in published application U.S. 2003/0025942 A1, and autogrid analysis described in pending applications Ser. No. WO 2001 29756, published Apr. 26, 2001, and U.S. Ser. No. 09/540,472, filed Mar. 31, 2000, all assigned to 3M Innovative Properties Company, the disclosures of which being incorporated herein by reference.

The actual wavefront of beam 38B can be calculated from the local shifts by any suitable algorithms, of which there are several. Examples are presented by W. H. Southwell, *Wavefront estimation from wave-front slope measurements*, JOSA Vol. 70, No. 8, p. 998 (1980), the disclosure of which is incorporated herein by reference. The wavefront at wavefront sensor 36 can then be related to the wavefront at objective lens 30 by application of known diffraction equations. These computations are performed by computer 18. The next step in the process involves relating the wavefront at objective lens 30 to the field at object 12. Once image information about the field at object 12 is obtained for each of the pixel locations within the region of interest, computer 18 assembles the image data and causes display 20 to produce an enhanced or higher resolution image of the region of interest which is based upon the wavefront shape data obtained from the pixel locations within the region of interest.

Figure 2:
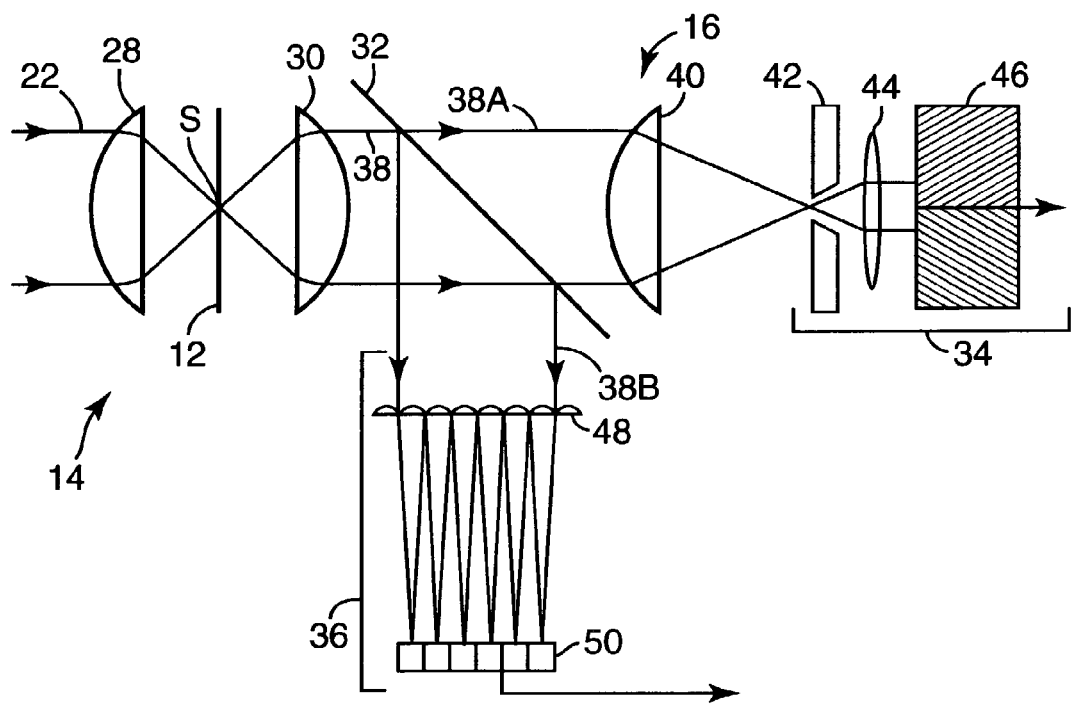
FIG. 2 is a diagram showing in greater detail the detection arm of the scanning laser microscope.

FIG. 2 shows detection arm 16 in greater detail. In particular, beam 22 in illumination arm 14 is shown being focused to spot S by focus lens 28 onto a pixel location at object 12. Diffracted light from object 12 is collected by objective lens 30 of detection arm 16 to produce beam 38. Beam splitter 32 splits beam 38 into first beam 38A and second beam 38B. Detector 34 is an integrating confocal detector formed by lens 40, spatial filter 42, lens 44, and photodetector 46. In FIG. 2, photodetector 46 is shown as a split detector to permit differential phase contrast (DPC) imaging, but a single uniform photodetector may also be used. Detector 34 may also take other forms, such as a non-confocal detector. Wavefront sensor 36 is a Hartmann-Shack Wavefront Sensor formed by lenslet array 48 and CCD detector array 50.

As illustrated in FIG. 2, beam 22 which is incident on the pixel location at object 12 may be mathematically characterized as a complex field $|U1|e^{j\Phi 1}$, where $|U1|$ is the magnitude of the field and $\phi 1$ is the phase of the field. The spatial information at object 12 at the pixel location may be represented by the complex variable t. As a result, the light diffracted from object 12 as a result of the incident beam 28 is $t|U1|e^{j\Phi 1}$, which is the product of the spatial information t and the incident beam $|U1|e^{j\Phi 1}$.

Objective lens 30 collects and collimates the diffracted light from object 12 to produce beam 38. The content of beam 38 may be characterized as $|U2|e^{j\Phi 2}$.

During the initial scan of object 12, incident beam 22 is scanned across each of the pixel locations of object 12. The diffracted light from object 12 is collected by objective lens 30, and beam 38 is directed to beam splitter 32. Beam 38 is split into beams 38A and 38B. During this first scan, the integrated intensity of beam 38A is detected by detector 34 to produce a pixel intensity at each pixel location.

Figure 3A:
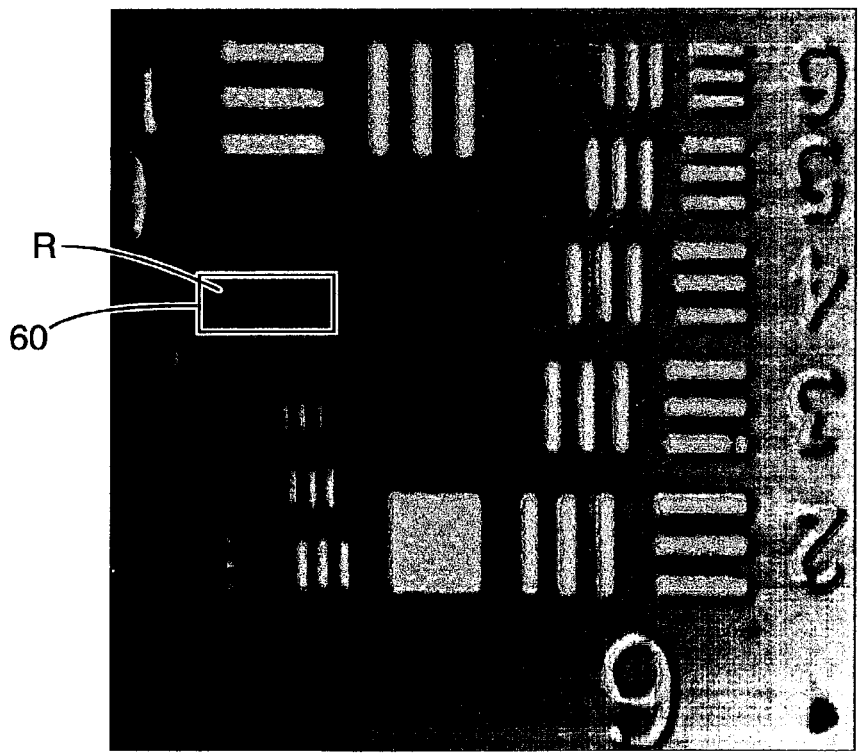
FIG. 3A shows a confocal image of an object scanned using regular detection, with a region of interest identified.

FIG. 3A shows an image of a test sample used as object 12. The test sample contains chrome features on a glass substrate. In FIG. 3A, a rectangular box 60 is drawn around a region of interest R which has been selected for further analysis. This selection can be made manually by the user reviewing the image on display 20 and drawing box 60 around region of interest R. Alternatively, regions may be selected for further analysis automatically by computer 18 based upon a computer analysis of local variations in the image. One technique for automatic selection with computer 18 applies a Sobel image analysis filter and selecting those regions having a high score using that filter. In either case, extra analysis may be performed only where needed—those regions with small scale features and regions at the edges of features. Large uniform regions, such as the generally flat region in the center of the image of FIG. 3A, might not be analyzed further.

Figure 3B:
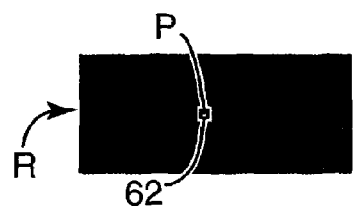
FIG. 3B is an enlarged image of the region of interest showing a pixel location within the region.

FIG. 3B is an enlarged view of region of interest R within box 60 of FIG. 3A. Once a region of interest is identified, incident beam 22 is again scanned over object 12, but this time only the region of interest is scanned. At each pixel location, wavefront data is collected using wavefront sensor 36. In FIG. 3B, one example pixel location P is shown within rectangular box 62.

Figure 3C:
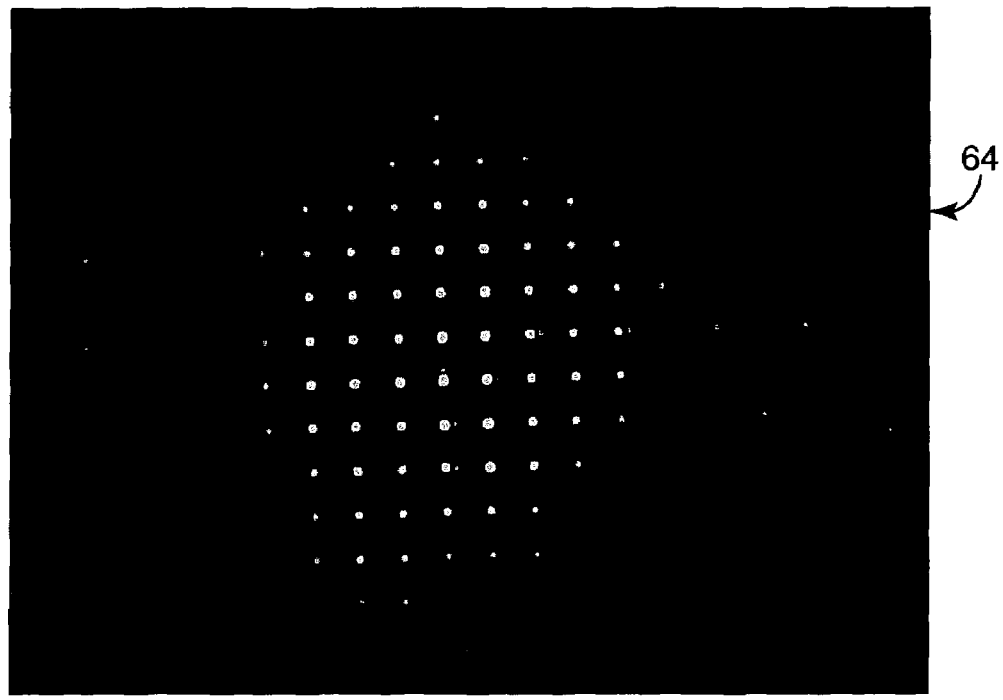
FIG. 3C is an HSWS image from the pixel location of FIG. 3B.

Wavefront sensor 36 produces an image, in the form of an array of spots, for each pixel location scanned within the region of interest. FIG. 3C shows an example of HSWS image 64 produced from pixel location P of FIG. 3B.

Figure 3D:
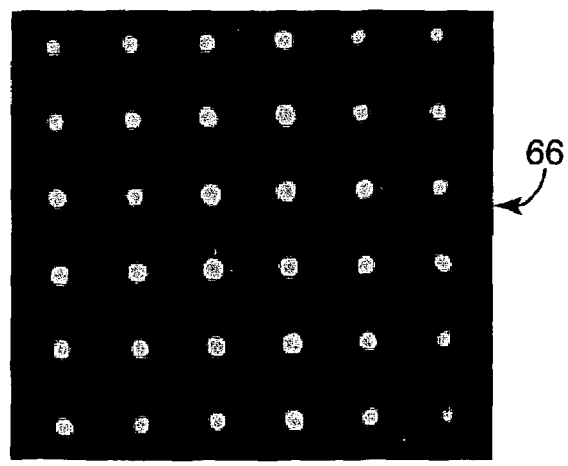
FIG. 3D is an enlarged image of a portion of the HSWS image of FIG. 3C.

FIG. 3D shows subarea 66 of the HSWS image 64 of FIG. 3C. As can be seen in FIG. 3D, the intensity of individual spots differs, and a shift in location of the spots is also detectable. At each pixel location, an HSWS image is produced, from which spot intensities and spot location shifts can be measured and stored.

Figure 3E:
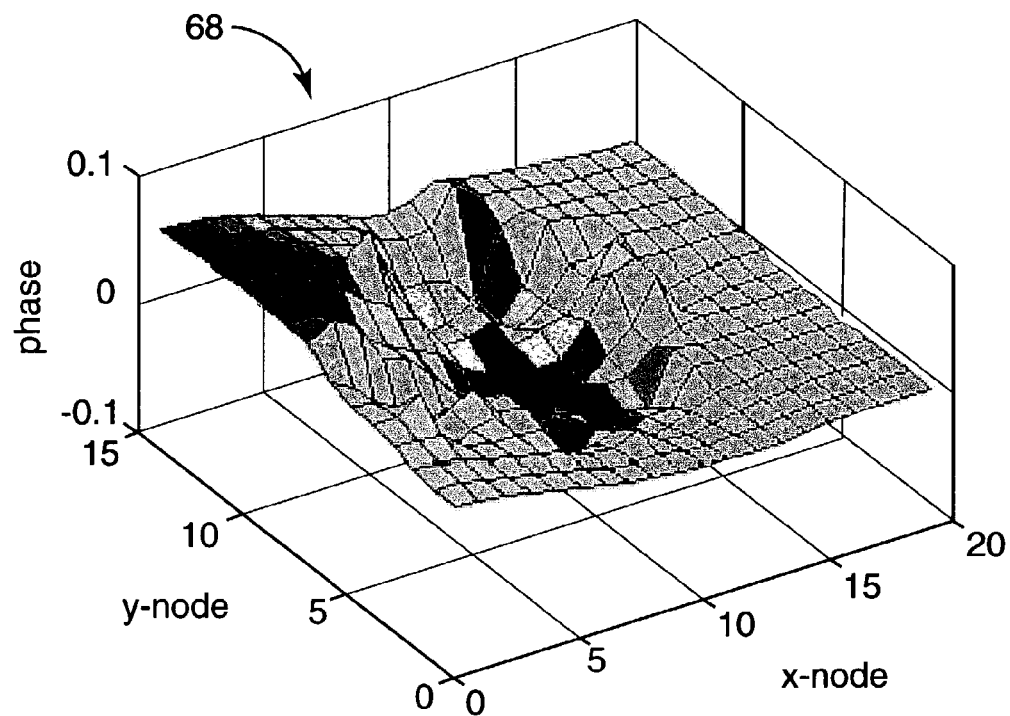
FIG. 3E is a graph of phase across pupil calculated from HSWS wavefront data shown in FIG. 3C.

From the spot shift (phase gradient) and intensity information, both wavefront intensity and wavefront shape can be determined. FIG. 3E shows a graph 68 of phase across the pupil for a particular pixel location. The present invention makes use of this phase information to provide additional information which will improve the resolution of microscope 10 beyond the conventional diffraction limit.

Figure 4:
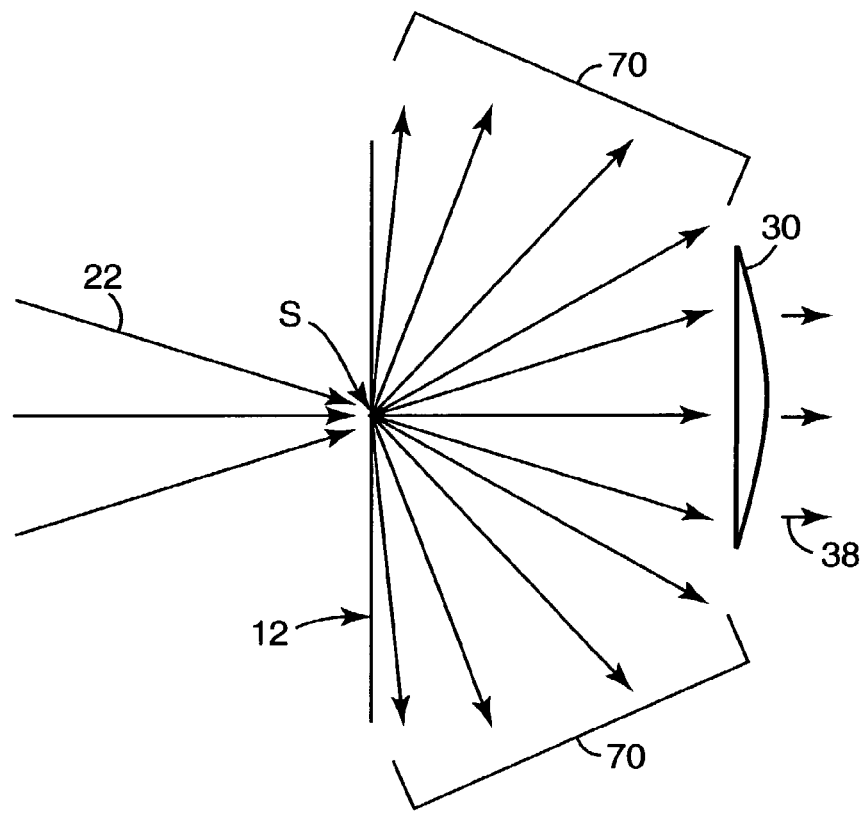
FIG. 4 is a diagram illustrating light diffraction produced by an incident focused spot on an object in a scanning laser microscope.

FIG. 4 illustrates how some light is collected and other light is not collected by objective lens 30 when object 12 is illuminated by focused light beam 22 at focused spot S. Both detector 34 and wavefront sensor 36 can only directly analyze light collected by objective lens 30. Scattered light 70 from object 12 is not collected. High spatial frequency features (in other words, small and rapidly changing features within the pixel location illuminated on object 12), will diffract or scatter the incident light at high angles. The light 70 scattered into these higher angles contain information about the high spatial frequency component of object 12, yet scattered light 70 is lost since it is not collected by objective lens 30.

An increase in the resolution of microscope 10 beyond this conventional diffraction limit can be achieved if these high spatial frequency components can be determined. The present invention is based upon the recognition that by analysis of waveform shape using the data from wavefront sensor 36, information regarding high spatial frequency components can be derived and used to provide a higher resolution image.

Figure 5:
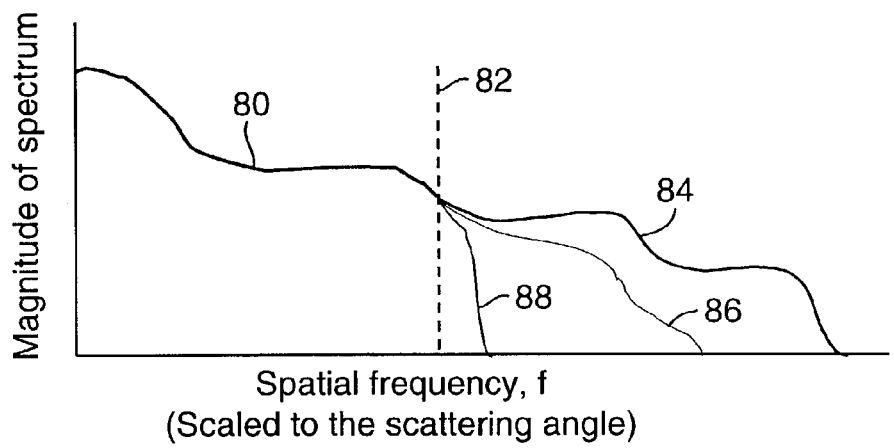
FIG. 5 is a graph of spatial frequency spectrum illustrating the use of analytic extension to identify a unique high frequency spectrum associated with a measured low frequency spectrum.

In a preferred embodiment of the present invention, analytic extension is used to determine high spatial frequency components based upon wavefront sensor data from the pixel locations within the region of interest. Analytic extension involves using the information in the low frequency portion of a spectrum to determine the portion of the spectrum which is beyond the system cutoff. FIG. 5 illustrates the concept of analytic extension with a graph of magnitude of the frequency spectrum as a function of spatial frequency. FIG. 5 shows measurable low frequency spectrum 80 which extends to system cutoff 82. At higher frequencies beyond system cutoff 82, three possible spectra 84, 86, and 88 are illustrated.

In the case considered here, the system cutoff 82 is determined by the maximum collection angle of objective lens 30, which is related to the numerical aperture NA of lens 30. As FIG. 5 indicates, there may be several high frequency spectra 84, 86, and 88 that could match the low frequency spectrum 80 (which was measured by wavefront sensor 30). However, as first shown in J. L. Harris, *Diffraction and Resolving Power*, JOSA Vol. 54, No. 7, pp. 931–936 (1964) the disclosure of which is incorporated herein by reference, if the spatial frequency (or angular) spectrum is analytic (which it is for electromagnetic fields), and is bounded in space (which it is by the finite size of focused spot S), then there is a unique high frequency spectrum (e.g. spectrum 86) which matches measured low frequency spectrum 80. Further, the high frequency portion of the spectrum can be calculated from the low frequency spectrum which has been measured.

The objective lens 30 acts as a low pass filter for optical information. It truncates the angular spectrum of diffracted light. However, since the measurable spectrum is analytic and the object is bounded in space, there is a unique extension of the spectrum that can be calculated. This means that higher spatial frequencies can be derived to produce better resolution images.

Figure 6C:
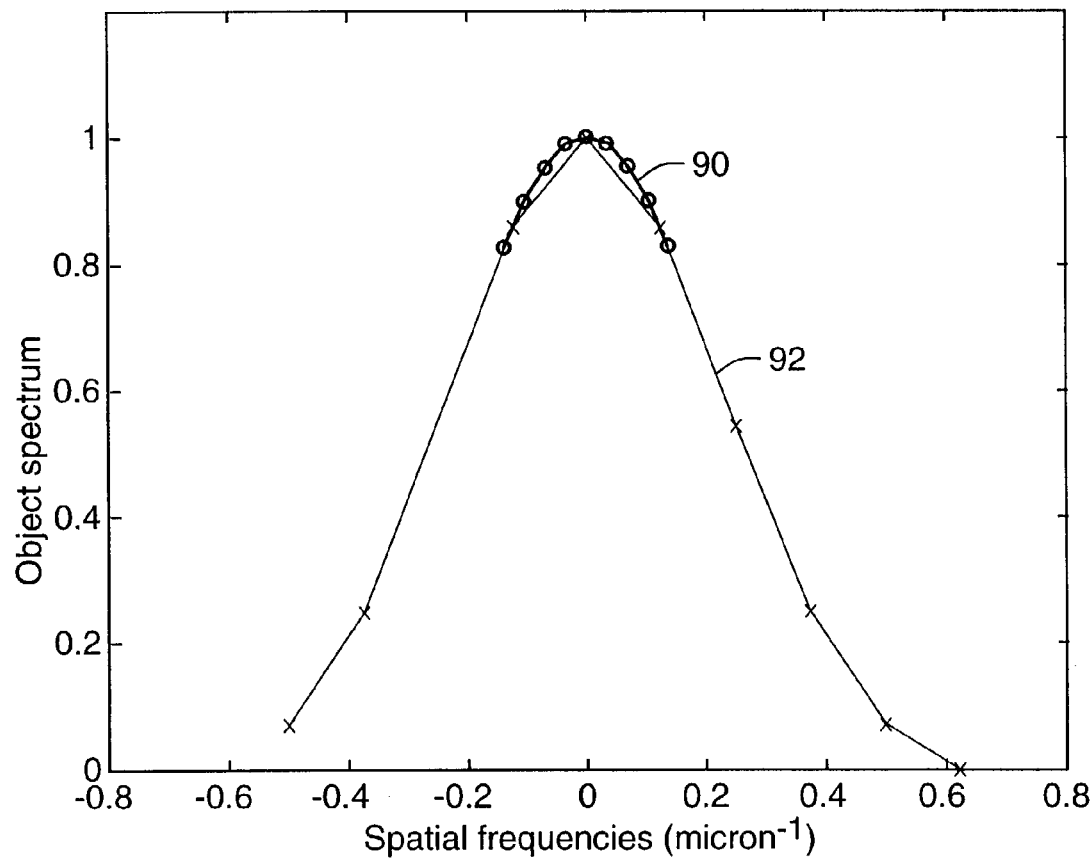
FIG. 6C shows a cross-section of the two-dimensional frequency spectra of FIGS. 6A and 6B illustrating both the truncated and extended spectra.
Figure 6A:
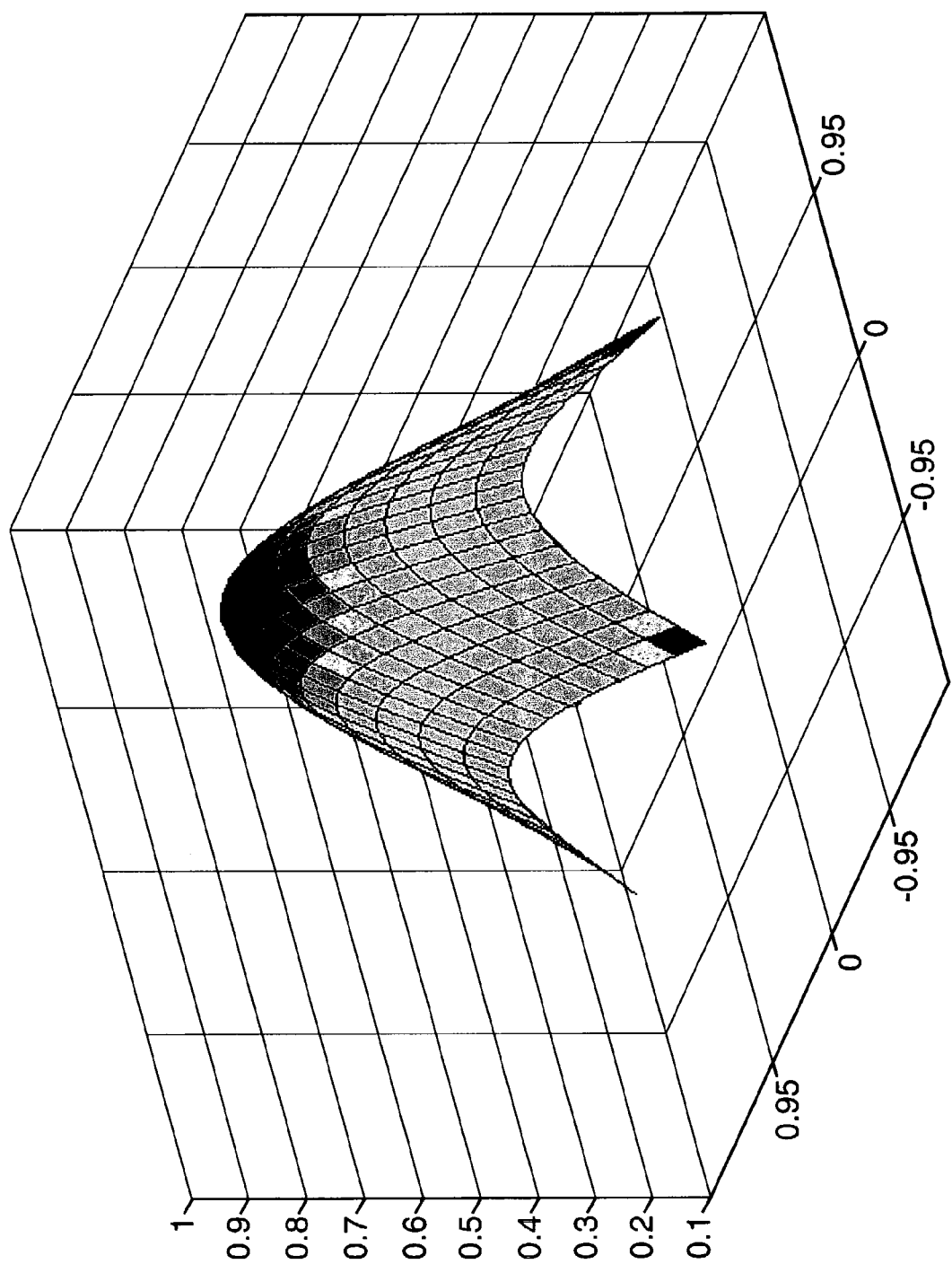
FIG. 6A shows a two-dimensional truncated Gaussian intensity profile.
Figure 6B:
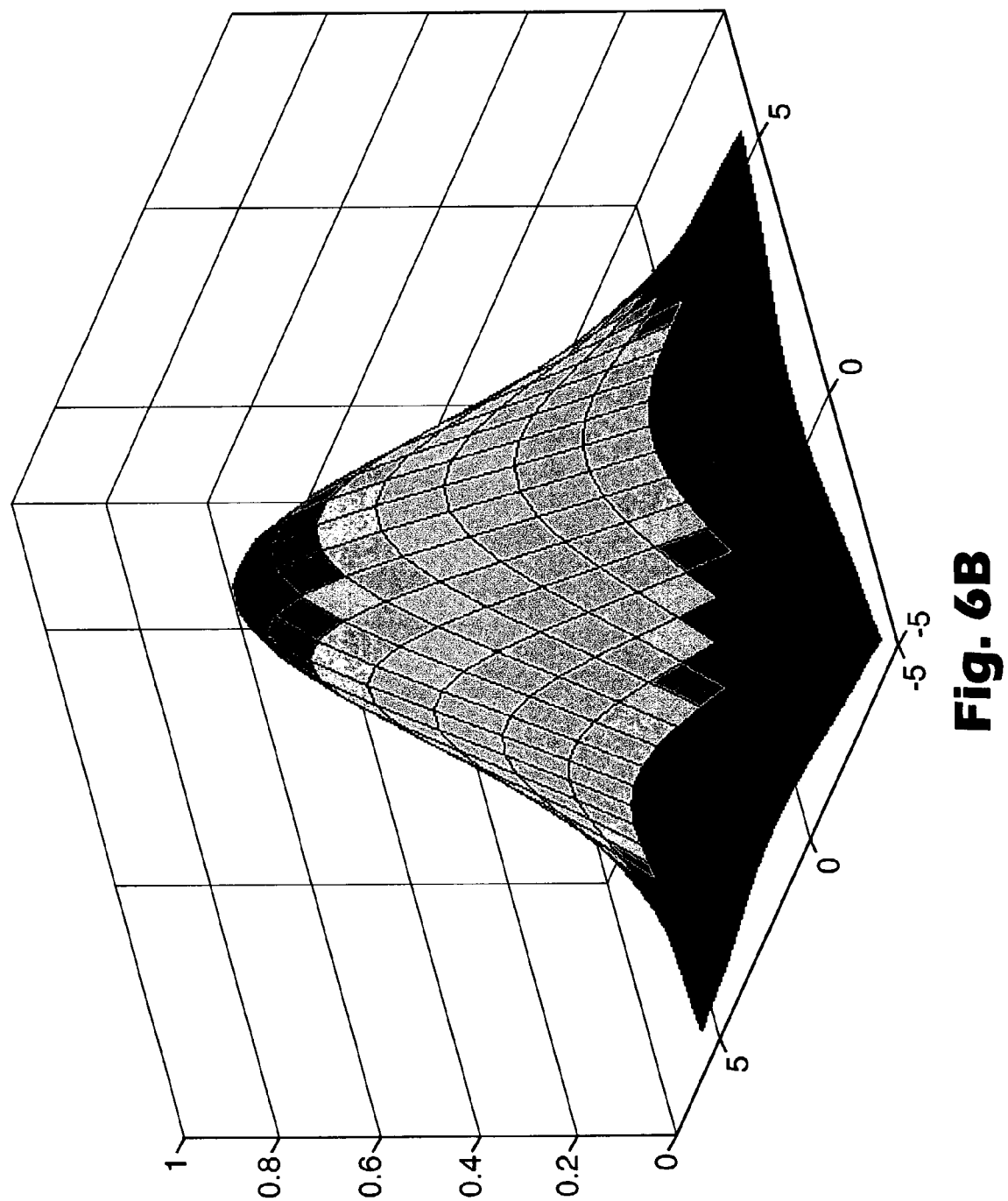
FIG. 6B shows an extended Gaussian profile determined using two-dimensional analytic extension.

FIGS. 6A–6C show graphs illustrating two-dimensional analytic extension. FIG. 6A shows a two-dimensional truncated Gaussian intensity profile of a spectrum, while FIG. 6B shows the same intensity profile extended using a two-dimensional analytic extension routine.

FIG. 6C illustrates a one-dimensional cross section through the two-dimensional spectrum. The original "true" spectrum was a two-dimensional Gaussian. Curve 90 was created by connecting discrete sample points (represented by circles) of the original spectrum, much like that which would be measured by wavefront sensor 36. As shown in FIG. 6C, the sample points are band limited to low spatial frequencies. These points were then used as input to analytic extension routines to produce extended spectrum 92. The extended spectrum matches the original or "true" spectrum beyond the band limited measurement represented by curve 90. This illustrates that analytic extension can be used to generate information beyond the band limit of the system. In the present invention, the information from wavefront sensor 36 is the low frequency portion of the angular spectrum of plane waves describing the scattered light, and high angle scattered light 70 shown in FIG. 4 is what computer 18 solves for using analytic extension.

Spatial frequencies at which the extended spectrum is calculated depend on the specific design of microscope 10. First, the number of spatial frequencies in the extended spectrum is equal to the number of spatial frequencies that are in the original spectrum (which corresponds to the number of measured spots from wavefront sensor 36). Second, the maximum spatial frequency at which the extended spectrum is calculated depends on the number of spatial frequency measurements in the original spectrum, and on the extent of a "bounding region" beyond which the measured signal may be set equal to 0. Specifically, if there are m spatial frequency measurements in the x direction (extending from −m/2 to +m/2, and there is no signal beyond a distance M from the center of the focused spot, then the maximum spatial frequency that can be solved for is $f_{max}=$ (m/2)/M.

Figure 7A:
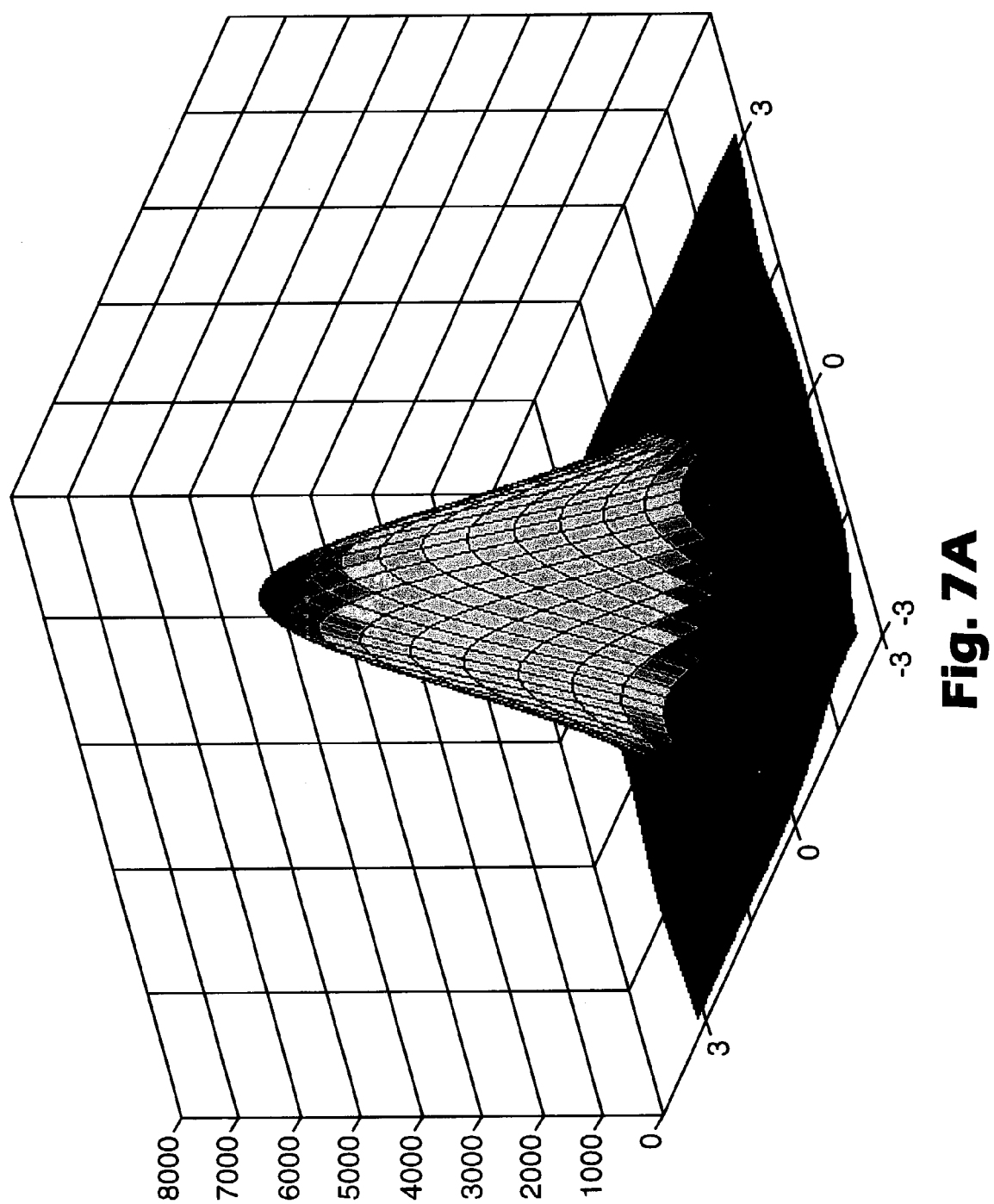
FIGS. 7A and 7B show point spread functions of a collected spectrum and a corresponding extended spectrum, respectively.
Figure 7B:
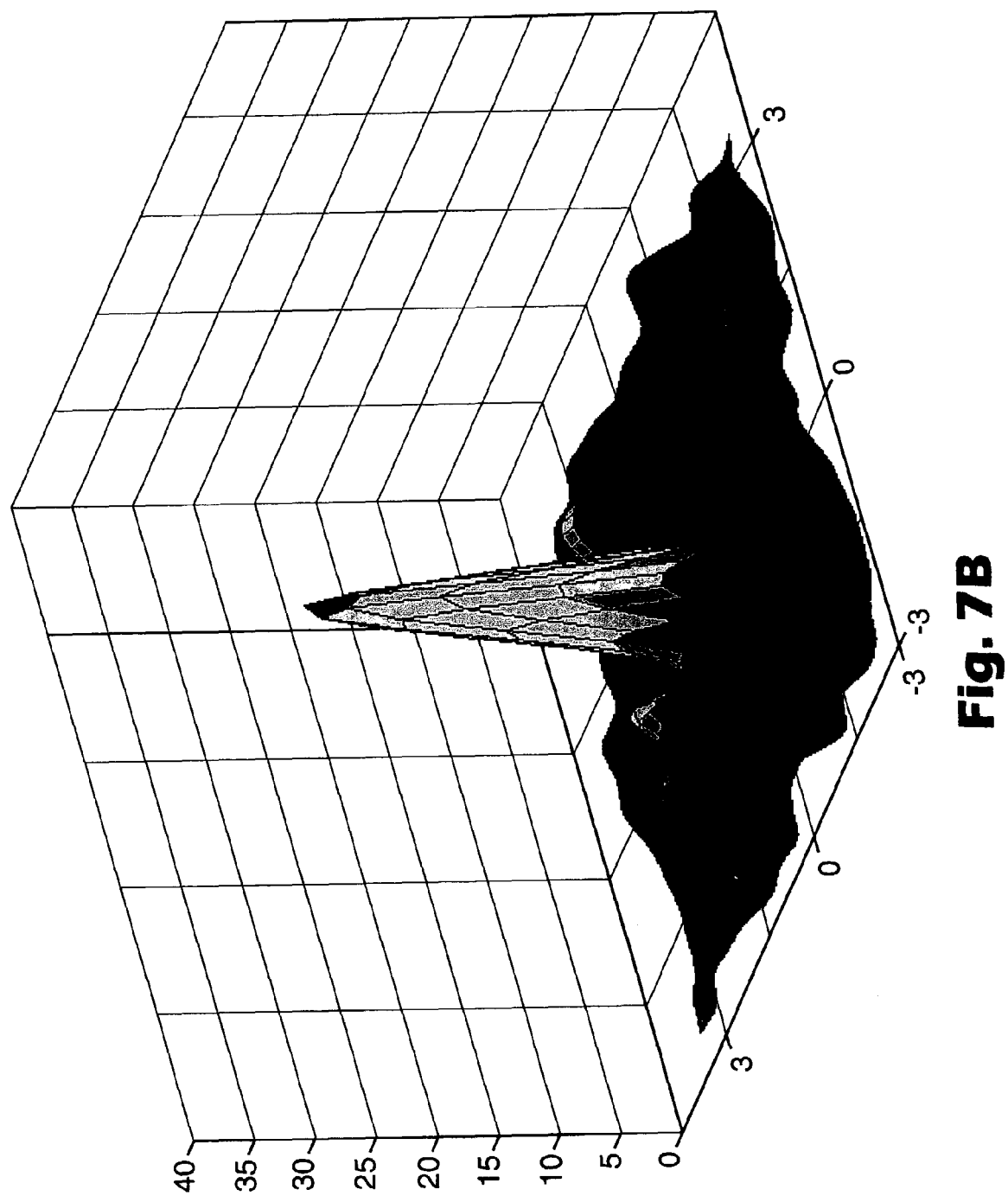

A series of HSWS images were taken at various points across a calibration target. FIGS. 7A and 7B show reconstructed spots from data from the calibration target. FIG. 7A shows a focused spot reconstructed from HSWS data, while FIG. 7B shows the same spot reconstructed with extended HSWS data using analytical extension. It is apparent that the focused spot reconstructed from the analytic extension data (FIG. 7B) is considerable narrower than that of the as collected HSWS data (FIG. 7A), which is expected. However, even the HSWS data as collected has the potential for more information than is possible with a conventional scanning microscope. In other words, greater resolution is achieved using data from wavefront sensor 36 on a pixel-by-pixel basis in a region of interest even if the as-collected data is used. Analytic extension provides still greater enhancement of the image.

The microscope of the present invention provides enhanced resolution images of areas containing high spatial frequency features. After a region of interest has been identified, the object is scanned in the region of interest. Wavefront data collected at each pixel location within the scanned region of interest is used to generate and enhance image for display.

In an alternate embodiment, the scanning laser microscope 10 is illustrated as having an unfolded configuration in which illumination arm 14 and detection arm 16 are separate. The present invention is equally applicable to folded configuration in which light is reflected from the object, and the illumination arm and the detection arm share components.

Various modifications and alterations of this invention will become apparent to those skilled in the art without departing from the scope and principles of this invention, and it should be understood that this invention is not to be unduly limited to the illustrative embodiments set forth hereinabove.

I claim:

1. A scanning laser microscope comprising:
   an illumination arm for scanning an object with a focused probe beam;
   a detection arm for receiving light from the object, the detection arm including a detector for collecting and detecting light from the object to produce pixel data for each of a plurality of pixels and a wavefront sensor for sensing phase variations of the light from the object to produce wavefront data for each of said plurality of pixels; and
   a data processor programmed to produce image data for the plurality of pixels based upon pixel data for each pixel and wavefront data for each pixel.

2. The scanning laser microscope of claim 1 wherein the detection arm includes:
   an objective lens for collecting light from the object; and
   a beam splitter for splitting light from the objective lens into a first beam directed to the detector and a second beam directed to the wavefront sensor.

3. The scanning laser microscope of claim 2 wherein the wavefront sensor comprises:
   a micro lens array for focusing the second beam into an array of spots; and
   a detector array for sensing the spots.

4. The scanning laser microscope of claim 3 wherein the data processor produces the wavefront data from sensor signals received from the detector array.

5. The scanning laser microscope of claim 4 wherein the data processor derives from the wavefront data information regarding uncollected scattered light from small scale features of a pixel location associated with the wavefront data, and produces image data for an enhanced resolution image based on the information.

6. The scanning laser microscope of claim 5 wherein the data processor derives the information using analytic extension.

7. The scanning laser microscope of claim 1 and further comprising:
   a display for displaying images of the object based upon image data from the data processor.

8. The scanning laser microscope of claim 7 wherein the data processor produces first image data based upon the pixel data and second image data based upon the wavefront data.

9. The scanning laser microscope of claim 8 wherein the display displays a first resolution image of the object based upon the first image data and a second higher resolution image of a region of interest of the object based upon the second image data.

10. The scanning laser microscope of claim 9 wherein the data processor controls the illumination arm to scan the region of interest to produce the second image data.

11. The scanning laser microscope of claim 10 wherein the data processor selects the region of interest based on the first image data.

12. The scanning laser microscope of claim 10 wherein the data processor selects the region of interest based upon a user input.

13. The scanning laser microscope of claim 1 wherein the illumination arm comprises:
   a laser for producing a light beam;
   a lens for focusing the light beam to an incident focused spot at the object; and
   scanning optics for scanning the incident focused spot across the object.

14. A scanning microscope comprising:
   an illumination arm for scanning a focused light spot over pixel locations of an object;
   an objective lens for collecting light from illuminated pixel locations;
   a wavefront sensor for sensing waveform shape of the collected light at each pixel location;
   a data processor programmed to derive, from the sensed waveform shape at each pixel location, image information for that pixel location; and
   a display for displaying an image of the object based upon the image information derived for the pixel locations.

15. The scanning laser microscope of claim 14 wherein the wavefront sensor comprises:
   a micro lens array for focusing the second beam into an array of spots; and
   a detector array for sensing the spots.

16. The scanning microscope of claim 14 wherein the data processor derives, from the wavefront shape, spatial frequency information regarding uncollected scattered light from small scale features of the pixel location associated with the wavefront shape, and produces image information for an enhanced resolution image based on the spatial frequency information.

17. The scanning microscope of claim 16 wherein the data processor derives the spatial frequency information using analytic extension.

18. The scanning microscope of claim 14 wherein the data processor controls the illumination arm to scan the region of interest.

19. The scanning microscope of claim 18 wherein the data processor automatically selects the region of interest.

20. The scanning microscope of claim 18 wherein the data processor selects the region of interest based upon a user input.

21. The scanning microscope of claim 14 wherein the illumination arm comprises:
   a laser for producing a light beam;
   a lens for focusing the light beam to the focused light spot at the object; and
   scanning optics for scanning the focused light spot across the object.

22. A method of high resolution imaging of an object, the method comprising:
   scanning the object to produce pixel data representing light intensity at a plurality of pixel locations;
   displaying an image of the object based upon the pixel data;
   selecting a region of interest of the image;
   scanning the region of interest;
   producing, for each pixel location of the region of interest, wavefront shape data at that pixel location;
   generating image data for each pixel location of the region of interest based upon the wavefront shape data from the pixel locations in the region of interest; and
   displaying an image of the region of interest based upon the image data.

23. The method of claim 22 wherein selecting a region of interest is based upon a user input.

24. The method of claim 22 wherein selecting a region of interest is based upon analysis of the pixel data.

25. The method of claim 22 wherein generating image data for each pixel location of the region of interest includes deriving a high frequency spectrum corresponding to uncollected scattered light from small scale features of each pixel location, and generating the image data based upon the high frequency spectra.

26. A method of producing an enhanced resolution scanned image of an object, the method comprising:
   identifying a region of interest of the object having small scale features;
   scanning pixel locations in the region of interest with a focused light beam;
   collecting light from the scanned pixel locations;
   sensing wavefront shape of the collected light from the scanned pixel locations;
   determining from the wavefront shape of the collected light from each pixel location a high frequency spectrum corresponding to uncollected scattered light from small scale features of that scanned pixel location; and
   providing an enhanced resolution image of the region of interest based on the high frequency spectra of the scanned pixel locations.

27. A method of producing an image of an object, the method comprising:
   illuminating an object with an incident focused spot;
   collecting light diffracted from low spatial frequency features of the object;
   measuring intensity of the collected light;
   deriving high spatial frequency features of the object based upon wavefront information of the collected light; and
   displaying an enhanced resolution image of the object based upon the derived high spatial frequency features.

* * * * *